United States Patent [19]

Sarrazin

[11] Patent Number: 4,565,255
[45] Date of Patent: Jan. 21, 1986

[54] WEIGHING DEVICE WITH STRAIN GAGES

[75] Inventor: Michel Sarrazin, Rumilly, France
[73] Assignee: SEB S.A., Selongey, France
[21] Appl. No.: 662,794
[22] Filed: Oct. 19, 1984

[30] Foreign Application Priority Data

Oct. 26, 1983 [FR] France .................. 83 17058

[51] Int. Cl.$^4$ .................. G01G 3/14; G01L 1/22
[52] U.S. Cl. .................. 177/211; 73/862.66; 73/862.67
[58] Field of Search .................. 177/211; 73/862.65, 73/862.66, 862.67

[56] References Cited

U.S. PATENT DOCUMENTS

| | | | |
|---|---|---|---|
| 2,771,579 | 11/1956 | Ruge | 177/211 X |
| 3,358,501 | 12/1967 | Ormond | 73/862.67 |
| 3,460,383 | 8/1969 | Padera . | |
| 3,576,128 | 4/1971 | Lockery | 73/862.67 |
| 3,661,220 | 5/1972 | Harris . | |
| 3,707,076 | 12/1972 | Jones | 177/211 X |
| 3,853,001 | 12/1974 | Mock . | |
| 4,061,198 | 12/1977 | Caldicott | 177/211 X |
| 4,453,609 | 6/1984 | Griffen et al. | 177/211 |

FOREIGN PATENT DOCUMENTS

| | | |
|---|---|---|
| 0017600 | 10/1980 | European Pat. Off. . |
| 0052257 | 5/1982 | European Pat. Off. . |
| 854903 | 12/1961 | France . |
| 2441839 | 6/1980 | France . |
| 2451571 | 10/1980 | France . |
| 2492095 | 4/1982 | France . |
| 2424523 | 7/1982 | France . |
| 2009940 | 6/1979 | United Kingdom .......... 177/211 |

*Primary Examiner*—George H. Miller, Jr.
*Attorney, Agent, or Firm*—Young & Thompson

[57] ABSTRACT

The opposite ends of a metal bar placed between a weighing platform and a base plate are rigidly fixed respectively to the platform and base plate. The metal bar carries flexure-sensitive strain gages and torsion-sensitive strain gages for cancelling the torsional stresses detected by the gages. Two pairs of flexure-sensitive strain gages are mounted on one face of the bar and aligned along the bar axis X—X'. The gages of each pair are connected in opposition of sign in a Wheatstone bridge circuit and an electric signal which is proportional to the force applied on the weighing platform is measured at the bridge terminals.

6 Claims, 8 Drawing Figures

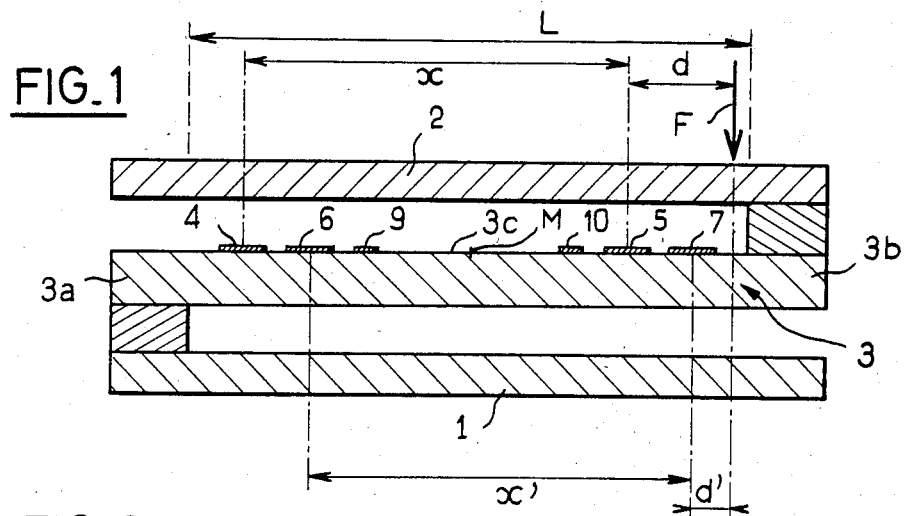
FIG. 1
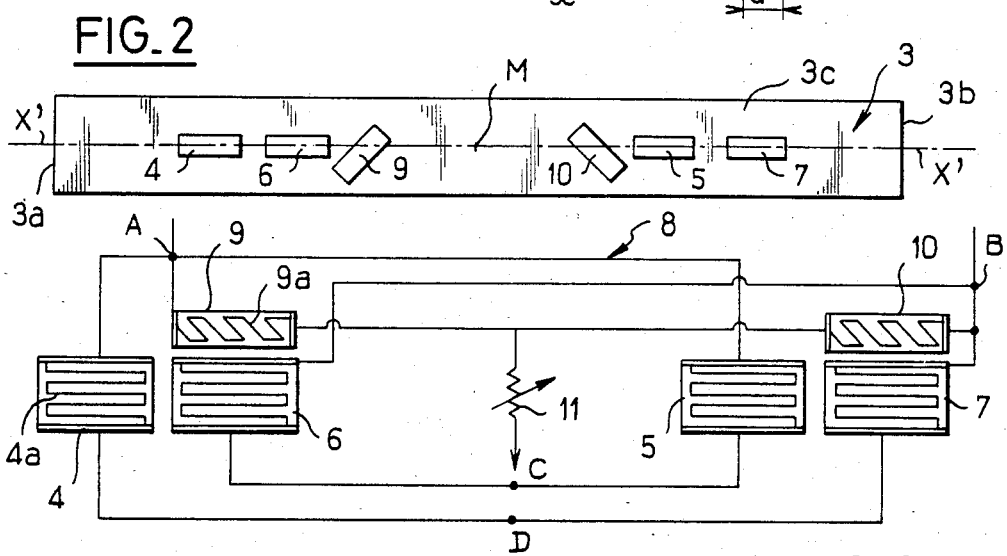
FIG. 2
FIG. 3
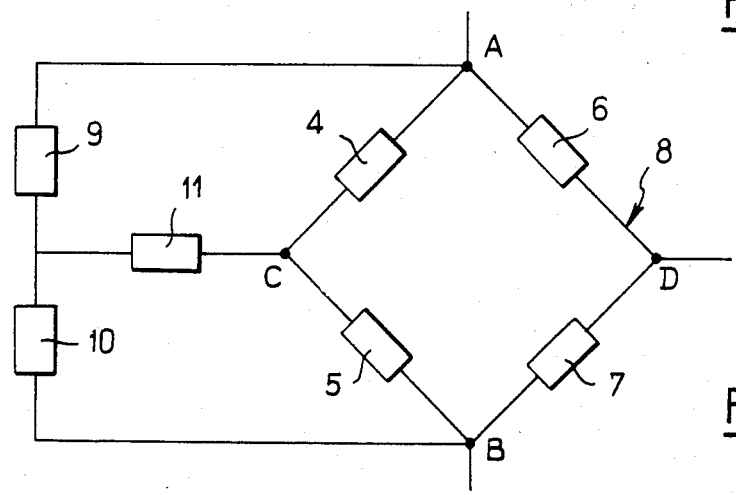
FIG. 4

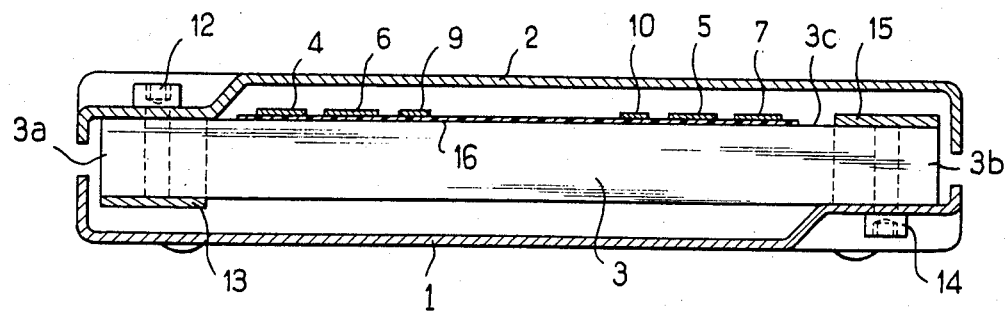
FIG_5
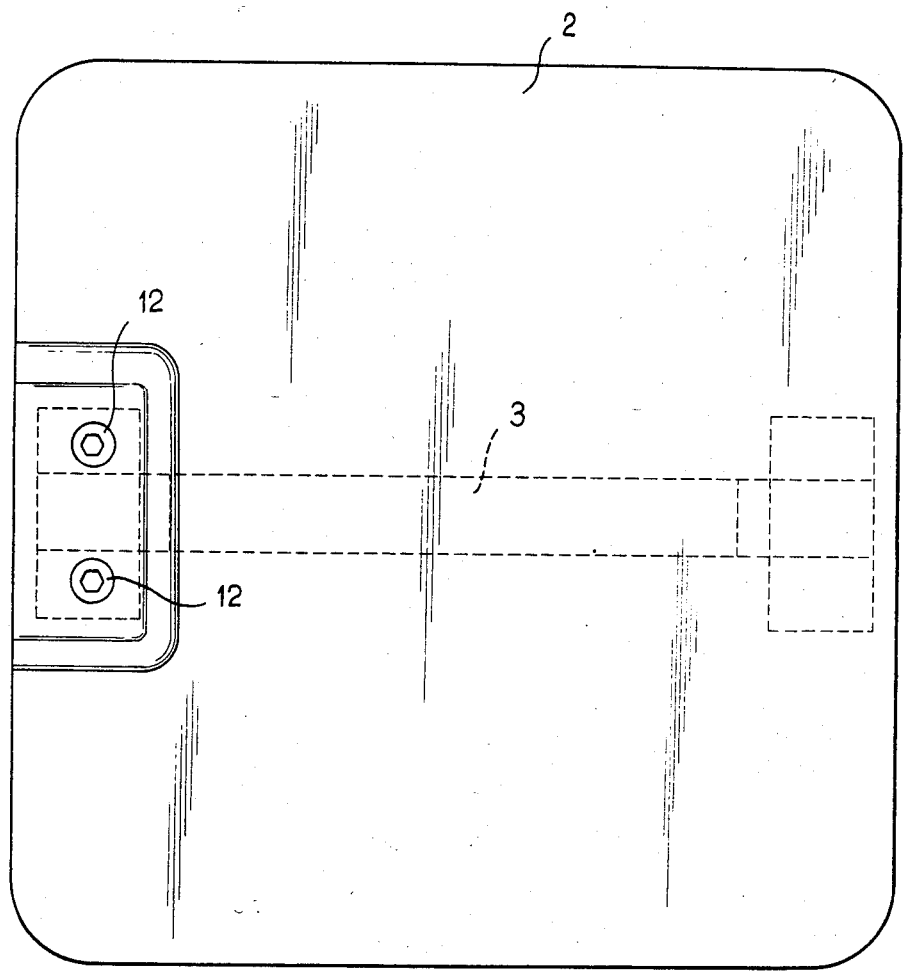
FIG_6

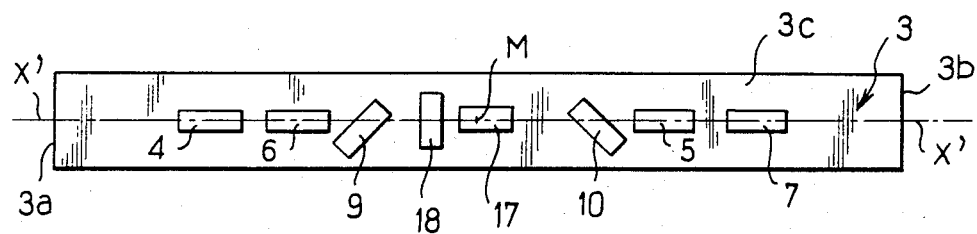
FIG_7
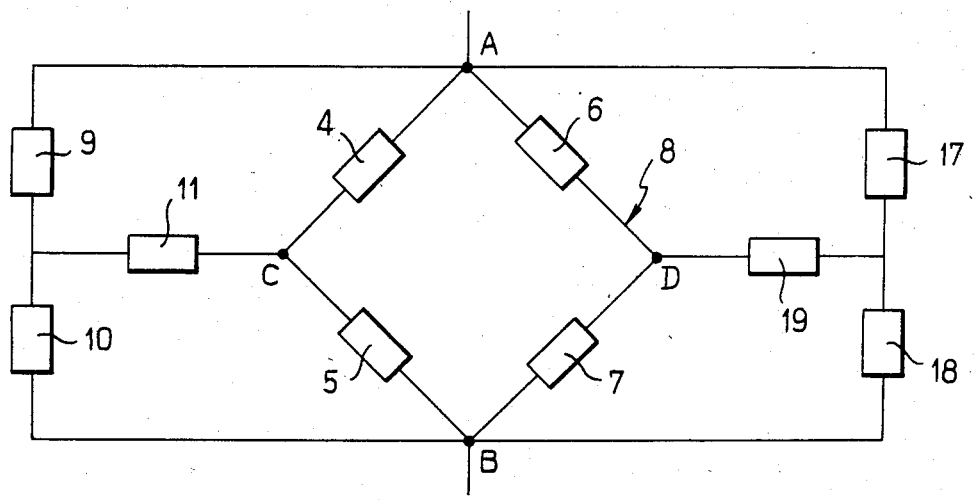
FIG_8

WEIGHING DEVICE WITH STRAIN GAGES

BACKGROUND OF THE INVENTION

1. Field of the Invention

The present invention relates to a weighing device such as person-weighing scales, food-weighing scales, or any other platform weigher.

2. Description of the Prior Art

In French patent application No. 82 20040 of Dec. 2, 1982, there has already been described a weighing appliance comprising a base plate and a platform which is substantially parallel to the base plate and designed to carry the load to be weighed. Between the platform and the base plate is placed a metal bar of square or circular cross-section, the opposite ends of which are rigidly fixed to said base plate and to said platform in order to permit flexural deformation of the bar under the action of the load applied on the platform.

The metal bar carries four strain gages, the axes of which are parallel to the axis of said bar and which are electrically connected in a Wheatstone bridge circuit.

Two of the adjacent strain gages in the Wheatstone bridge are located on one face of the bar (for example the face that is nearest the platform) and the two other gages are located on the opposite face.

This arrangement of the strain gages makes it possible to measure at the output terminals of the Wheatstone bridge a signal which is theoretically proportional to the force applied on the weighing platform.

In view of the fact that the resultant of the forces applied on the platform may be located at a point remote from the axis of flexure of the bar, the torsional stresses to which the bar may be subjected are liable to produce measurement errors which can attain 5 to 6%.

In the device described in the cited French patent application No. 82 20040, the drawback just mentioned has been suppressed by connecting two torsion-sensitive strain gages having axes inclined at 45° to the axis of the bar, in series with the electric supply terminals of the Wheatstone bridge formed by the four flexure-sensitive strain gages and by connecting an adjustable resistor in parallel with the two gages aforesaid and one of the terminals for measurement of the signal delivered by the Wheatstone bridge.

This arrangement makes it possible to cancel the torsional stresses detected by the flexure-sensitive strain gages.

However, the arrangement of the four flexure-sensitive strain gages on two opposite faces of the bar has the effect of introducing a considerable complication in the mass production of the weighing device and in the calibration of the device.

The precise object of the invention is to overcome the disadvantage just mentioned.

SUMMARY OF THE INVENTION

The weighing device contemplated by the invention comprises a base plate disposed in substantially parallel relation to a platform for carrying the load to be weighed. The opposite ends of at least one metal bar placed between the base plate and the platform are rigidly fixed respectively to said base plate and said platform in order to permit flexural deformation of said bar under the action of the load applied on the platform. The bar is adapted to carry flexure-sensitive strain gages connected electrically in a Wheatstone bridge circuit and torsion-sensitive strain gages connected to said bridge circuit in order to cancel the torsional stresses detected by the flexure-sensitive strain gages. The bar is provided on one and the same flat face with two flexure-sensitive strain gages which are substantially aligned on the longitudinal axis of the bar.

The distinctive feature of the device in accordance with the invention lies in the fact that the strain gages of each pair are connected in opposition in the Wheatstone bridge and that two torsion-sensitive strain gages are coupled in series and connected respectively to the supply terminals of the Wheatstone bridge and that an adjustable resistor is connected in parallel between the two torsion-sensitive gages and with one of the terminals for measurement of the Wheatstone bridge signal.

The present Applicant has found that the above-mentioned mode of connection of the four flexure-sensitive strain gages makes it possible to mount these latter on one and the same face of the bar, thus considerably facilitating mass production of bars equipped with strain gages of this type.

This mode of connection of strain gages also makes it possible to mount the gages on a common support strip and thus to ensure practically perfect alignment of the gages along the longitudinal axis of the bar. This in turn makes it possible in theory to eliminate any torsion component which would be liable to affect the result of the measurements.

Even in this case, however, experience has shown that it is nevertheless an advantage to arrange the torsion-sensitive strain gages symmetrically with respect to the midpoint of the bar (the gages being coupled in series and connected respectively to the electric supply terminals of the Wheatstone bridge) and to connect an adjustable resistor between the common node of these two torsion-sensitive gages and one of the terminals for measurement of the Wheatstone bridge signal.

In a preferred embodiment of the invention, the two torsion-sensitive strain gages are located on the same face as the four flexure-sensitive gages and the axis of said two gages is inclined at 45° with respect to the axis of alignment of the four gages aforesaid.

Thus the complete set of strain gages and the electric circuit for current supply and connection of these gages can be applied on a single support (or two supports at the most) of electrically insulating material which is fixed on the face opposite to the weighing platform or on the face opposite to the base plate.

The result thereby achieved is that the bars which are intended to equip the weighing devices in accordance with the invention can be manufactured under optimum conditions of economy.

BRIEF DESCRIPTION OF THE DRAWINGS

Other features of the invention will be more apparent upon consideration of the following description and accompanying drawings, wherein:

FIG. 1 is a schematic longitudinal sectional view of a weighing device in accordance with the invention;

FIG. 2 is a top view of the bar showing the arrangement of the strain gages;

FIG. 3 is a view showing the electric circuit for interconnection of the strain gages;

FIG. 4 is a schematic view which is equivalent to that of FIG. 3 and shows a conventional Wheatstone bridge circuit to which are added two torsion-measuring strain gages and the adjustable resistor;

FIG. 5 is a longitudinal sectional view of a weighing device in accordance with the invention;

FIG. 6 is a top view of said device;

FIG. 7 is a plan view of a bar in accordance with an alternative embodiment of the invention;

FIG. 8 shows a Wheatstone bridge with two additional gages and an adjustable resistor.

DESCRIPTION OF THE PREFERRED EMBODIMENTS

In the embodiment of FIG. 1, the weighing device in accordance with the invention comprises a base plate 1 and a platform 2 which is parallel to this latter and intended to carry the load to be weighed such as the weight of a user, for example.

Between said platform 2 and said base plate 1 is placed a metal bar 3 of square cross-section and of hardened steel, for example. The opposite ends 3a, 3b of said bar are rigidly fixed respectively to the weighing platform 2 and to the base plate 1 in order to permit flexural deformation of the bar 3 under the action of the load applied on the platform 2.

As shown in FIG. 2, the flat face 3c of the bar 3 which is located opposite to the platform 2 is adapted to carry two pairs of flexure-sensitive strain gages 4, 6; 5, 7 which are aligned on the longitudinal axis X—X' of the bar 3 and disposed symmetrically with respect to the midpoint M of said bar.

The above-mentioned strain gages 4, 6; 5, 7 are constituted by flat electric resistors having parallel resistive elements such as the element 4a (as shown in FIG. 3) which describe a sinuous path. These filaments 4a are aligned with the axis X—X' of the bar 3.

The four strain gages 4, 6; 5, 7 are connected in a Wheatstone bridge circuit 8 (as shown in FIGS. 3 and 4).

In the diagrams of FIGS. 3 and 4, the points A and B located respectively between the gages 4 and 6 and the gages 5 and 7 designate the electric current supply terminals of the Wheatstone bridge 8.

The points C and D located between the gages 4 and 5 and 6 and 7 are the terminals between which is measured the electric signal resulting from a bridge unbalance caused by flexural deformation of the bar 3 as will hereinafter be described in greater detail.

Two torsion-sensitive strain gages 9, 10 are placed on the same face 3c of the bar 3 between the flexure-sensitive gages 4, 5; 6, 7 and disposed symmetrically with respect to the midpoint M of the bar. The axis of said gages 9, 10 is inclined at 45° with respect to the axis X—X' of the bar 3 (as shown in FIG. 2). The same result can be obtained by inclining the parallel filaments 9a (as shown in FIG. 3) at 45° with respect to the filaments 4a of the other strain gages.

Said two torsion-sensitive strain gages 9, 10 (as shown in FIG. 4) are coupled in series and connected respectively to the current supply terminals A and B of the Wheatstone bridge 8.

An adjustable electric resistor 11 is connected in parallel between the two gages 9, 10 and with one of the terminals C or D for measurement of the signal emitted by the Wheatstone bridge 8, depending on the direction of deviation of the parasitic torsion component which has appeared on the strain gages of the bridge 4, 5; 6, 7.

FIGS. 5 and 6 illustrate a weighing platform constructed in accordance with the invention.

The end 3a of the bar 3 which extends between the base plate 1 and the top plate or weighing platform 2 is secured to said platform 2 by means of two screws 12 which pass through the platform and by means of a backing-plate 13 placed opposite to the heads of the screws 12.

Similarly, the end 3b of the bar 3 is secured to the base plate 1 by means of two screws 14 which are passed through the base plate and by means of a backing-plate 15 placed opposite to the heads of the screws 14.

All the strain gages 4, 5, 6, 7, 9, 10 are applied on that face 3c of the bar which is located opposite to the platform 2. The complete set of gages is mounted on an insulating support 16 formed in one piece and consisting for example of a sheet of polyimide bonded to the surface of the bar 3.

The operation of the weighing device described in the foregoing takes place as follows.

When a load is applied on the weighing platform 2, the bar 3 tends to bend towards the base plate 1. This flexural deformation of the bar 3 gives rise either to expansion or to contraction of the resistive filaments of the strain gages 4, 5, 6, 7. This has the effect of modifying the ohmic value of said filaments, thus producing unbalance of the Wheatstone bridge 8 and generating an electric signal between the terminals C and D of this latter.

A measurement of this signal is converted by known means to a measurement of the load applied on the weighing platform 2.

In more precise terms, the signal measured between the terminals C and D of the Wheatstone bridge 8 is proportional to the algebraic sum of the following stresses:

$$(\vec{S_4}-\vec{S_5})+(\vec{S_6}-\vec{S_7})$$

where $\vec{S_4}$, $\vec{S_5}$, $\vec{S_6}$ and $\vec{S_7}$ designate respectively the stresses sustained by the strain gages 4, 5, 6 and 7.

This signal is consequently proportional to the following sum of the bending moments:

$$[F(x + d) - F \cdot d] + [F(x' + d') - F \cdot d']$$
$$= F \cdot x + F(x')$$
$$= F(x + x')$$

where

F (see FIG. 1) is the force applied on the weighing platform 2, x is the distance between the strain gages 4 and 5, x' is the distance between the gages 6 and 7, d is the distance between the gage 5 and the point of application of the force F, d' is the distance between the gage 7 and the point of application of the force F.

Since x and x' are constants, the measured signal is proportional to the force F irrespective of the point of application of said force on the platform 2.

This result is thus obtained with the four flexure-sensitive strain gages 4, 6; 5, 7 which are aligned on one and the same face 3c of the bar 3.

In the case of the device described in French patent application No. 82 20040, the positions of the strain gages 6 and 7 in the Wheatstone bridge were reversed with respect to those proposed by the present invention.

Thus, in order to ensure that the signal emitted by the Wheatstone bridge is proportional to the stresses sustained by the gages, the two pairs of gages had to be placed on two opposite faces of the bar, thus considerably complicating the mass production of bars.

In the case of the present invention, it is possible to obtain practically perfect alignment of the gages 4, 6; 5, 7 along the axis X—X' of the bar 3.

However, experience shows that even a very slight misalignment of these gages produces a parasitic signal which slightly impairs the accuracy of measurement. This drawback is avoided by means of the two torsion-sensitive strain gages 9 and 10. When the bar 3 is subjected to slight torsion, these gages generate a signal which corrects the signal measured between the terminals C and D of the Wheatstone bridge. The signal produced by the torsion is set by adjusting the resistor 11 which is connected to the terminal C or D at the time of assembly of the weighing device, according to the direction of the parasitic torsion signal.

Furthermore, the arrangement of the strain gages on one and the same face of the bar 3 permits a well-defined separation between the pair of gages 4, 6 and the pair of gages 5, 7. This in turn permits an increase in the slope of the signal which is proportional to the stress, that is, in the sensitivity of the weighing device.

This slope is equal to the relation:

$$a = 3 \cdot K \cdot \frac{x}{E \cdot H^3} \text{ in } V \cdot V^{-1} \cdot \text{Kg}^{-1}$$

where

K is the constant of the strain gages,
x is the distance between the gages,
H is the thickness of a bar of square cross-section,
E is the Young's modulus of said bar.

Thus in the case of a bar having a length L=149 mm, a height of side H=18 mm, a Young's modulus E=22,000 daH/mm² and with x=109 mm, there is obtained a slope a=5.097 $10^{-6}$V×V$^{-1}$×Kg$^{-1}$.

The measured slope is slightly lower than the theoretical slope calculated by the relation given above since the two torsion-compensating gages 9 and 10 slightly reduce the amplitude of the signal.

However, the signal measured between the terminals C and D of the Wheatstone bridge attains a maximum value and exhibits a negligible temperature drift since the strain gages are arranged in a complete Wheatstone bridge circuit.

In the embodiment described in the foregoing, a particular arrangement of the strain gages in a Wheatstone bridge makes it possible to obtain a linear signal which is proportional to the weight placed on the platform 2 and independent of the point of application of this weight on the platform.

A disadvantage nevertheless remains when a very high standard of accuracy of the weighing device is required since a displacement of the point of application of the force along the longitudinal axis of the bar 3 results in a signal variation on each side of a central point.

This phenomenon arises from a displacement of the neutral fiber of the bar, with the result that the moments of inertia opposite to the strain gages are not constant at the time of displacement of the force along the longitudinal axis of the test body.

In fact, it is possible to resolve a weight applied on the platform 2 into a component which is parallel to this latter (compression or tension) and a perpendicular component.

There is observed a displacement of the neutral fiber which generates the differences in measured signals when the weight is applied to each end of the sensor in the case of a bar 3 of rectangular section.

Using the following notations:
ϵ=relative elongation,
F=force,
a=width,
h=height of bar,
l=length of bar,
E=Young's modulus,
V=distance between the longitudinal axis of the bar and a point,
I=moment of inertia, $$\epsilon = \frac{\vec{Fl}}{E\,I/V} + \frac{\vec{T}}{bh}$$

by developing, we obtain:

$$\epsilon = \frac{P(12\,l\,V\cos\alpha + Eh\sin\alpha)}{E\,bh^3}$$

$$\epsilon = 0 \rightleftarrows 12\,l\,V\cos\alpha = -Eh\sin\alpha$$

$$V = -\frac{Eh\sin\alpha}{12\,l\cos\alpha}$$

It is observed that the sign and the value of V are dependent on α and therefore on the position of the weight.

In order to circumvent the above disadvantage, the improvement in accordance with the invention consists in placing two strain gages 17 and 18 near the center M of the bar 3 (as shown in FIG. 7), the gage 17 being aligned along the axis X—X' and the gage 18 being perpendicular to this axis.

FIG. 8 shows how the gages 17 and 18 are connected to the Wheatstone bridge. The gage 17 is connected to the terminal A and the gage B is connected to the terminal B. Said gages are also coupled to each other and connected to the terminal D through a resistor 19 which serves to adjust the displacement along the longitudinal axis X—X' of the bar 3.

The adjustment of this resistor is carried out as follows:

one and the same weight is placed successively at each end of the bar 3 and the signal difference is noted;

the adjustment bridge is connected to the terminal C or D, depending on the sign of said difference, the ohmic value of the resistor 19 is adjusted proportionally to the amplitude of the signal, thereby ensuring that there is no longer any difference in value of this signal according to the position of application of the force along the axis of the bar 3.

It will be readily apparent that the invention is not limited to the example described in the foregoing and a number of modifications can accordingly be contemplated without thereby departing either from the scope or the spirit of the invention.

Thus a plurality of identical bars could be placed between the base plate 1 and the weighing platform 2 according to the loads or forces to be applied on the platform.

Furthermore, the devices for measuring the electric signal at the terminals of the Wheatstone bridge can be placed either within the weighing device or outside this latter.

It is also possible to provide a bar 3 having a cross-section which need not be square but can have any other shape such as a rectangular or circular shape, for example, provided that the moments of inertia opposite to the strain gages are strictly equal.

What is claimed is:

1. A weighing device comprising a base plate (1) and a platform (2) for carrying the load to be weighed, said platform being substantially parallel to said base plate, at least one metal bar (3) being placed between said base plate and said platform, the opposite ends (3a, 3b) of said bar being rigidly fixed to said base plate (1) and to said platform (2) in order to permit flexural deformation of said bar under the action of the load applied on the platform, said bar being adapted to carry flexure-sensitive strain gages (4, 5, 6, 7) connected electrically in a Wheatstone bridge circuit (8) and torsion-sensitive strain gages (9, 10) connected to said bridge circuit in order to cancel the torsional stresses detected by the flexure-sensitive strain gages, the bar (3) being provided on one and the same flat face (3c) with two pairs (4, 6; 5, 7) of flexure-sensitive strain gages substantially aligned on the longitudinal axis (X—X') of the bar, wherein the gages of each pair (4, 6; 5, 7) are connected in opposition in the Wheatstone bridge and wherein two torsion-sensitive strain gages (9, 10) are coupled in series and connected respectively to the supply terminals (A, B) of the Wheatstone bridge (8) and wherein an adjustable resistor (11) is connected in parallel between the two torsion-sensitive gages (9, 10) and with one (C or D) of the terminals for measurement of the Wheatstone bridge signal.

2. A weighing device according to claim 1, wherein the two torsion-sensitive strain gages (9, 10) are located on the same face (3c) as the four flexure-sensitive gages (4, 6; 5, 7) and the axis of said two gages is inclined at 45° with respect to the axis of alignment (X—X') of the four gages aforesaid.

3. A weighing device according to claim 2, wherein the two torsion-sensitive strain gages (9, 10) are located symmetrically with respect to the midpoint of the bar and between or outside the two pairs of flexure-sensitive gages (4, 6; 5, 7).

4. A weighing device according to claim 3, wherein the set of strain gages (4, 6; 5, 7; 9, 10) and the electric circuit (8) for supply and interconnection of said gages are disposed on a single support of electrically insulating material which is fixed on the face (3c) of the bar (3).

5. A weighing device according to claim 4, wherein the face (3c) aforesaid is located either opposite to the platform 2 or opposite to the base plate.

6. A weighing device according to claim 5, wherein said device is further provided near the midpoint (M) of the bar (3) with a strain gage (17) aligned along the axis (X—X') of the bar and a strain gage (18) perpendicular to said axis, said two gages (17) (18) being coupled in series and connected respectively to the terminals (A, B) of the Wheatstone bridge (8) and wherein an adjustable resistor (19) is connected in parallel between the two gages (17) (18) and with one of the terminals (C or D) for measurement of the Wheatstone bridge signal.

* * * * *